May 20, 1941.  R. D. LANCASTER  2,242,708

SPONGE RUBBER FLY

Filed Sept. 3, 1940

Raymond D. Lancaster, INVENTOR

BY Victor J. Evans & Co.

ATTORNEYS

Patented May 20, 1941

2,242,708

UNITED STATES PATENT OFFICE 2,242,708

SPONGE RUBBER FLY

Raymond D. Lancaster, Ashtabula, Ohio

Application September 3, 1940, Serial No. 355,265

1 Claim. (Cl. 43—48)

This invention relates to sponge rubber flies and has for an object to provide a fishing fly in which the fly body is more securely fastened to the hook than conventional flies and to accomplish this in accordance with the invention the shank of the hook is provided with a closed eye or other anchorage and the fly body is moulded on the shank in a manner to cause a portion of the body to pass through the anchorage.

A further object is to provide a fishing fly having rubber thread legs which are drawn through the body and through the eye to firmly secure the legs to the body and minimize dislodgement of the fly body from the hook since the rubber thread legs have more shear resistance, that is, the ability to resist cutting, than the sponge rubber body.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 4:
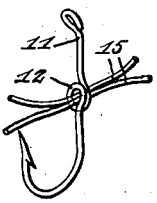
Figure 4 is a detail perspective view of one form of hook showing a closed loop anchorage.
Figure 5:
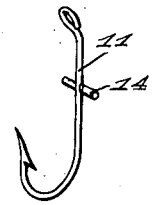
Figure 5 is a detail perspective view of another form of hook showing a bar anchorage.
Figure 3:
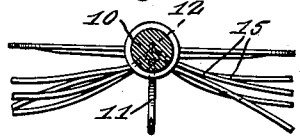
Figure 3 is a cross sectional view of the fly taken on the line 3—3 of Figure 1.
Figure 6:
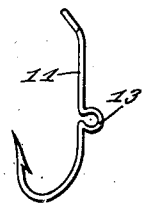
Figure 6 is a side elevation of another form of hook showing an open loop anchorage.

Referring now to the drawing in which like characters of reference designate similar parts in the various views, the sponge rubber fly comprises a body 10 shaped to simulate a fly insect and formed of sponge rubber. The body is secured to a fishing hook 11 which may be provided in its shank with a closed eye 12 as shown in Figure 4, an open eye 13 as shown in Figure 6, or merely a bar 14 as shown in Figure 5 to form an anchorage. The fly body is preferably moulded onto the hook and a portion of the body passes through the anchorage, if it be a loop, or around the anchorage if it be a bar, to form a lock to prevent displacement of the body from the hook.

Figure 1:
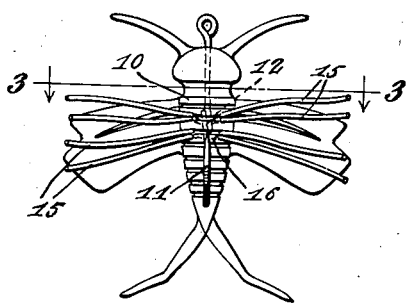
Figure 1 is a plan view of a fishing fly constructed in accordance with the invention.
Figure 2:
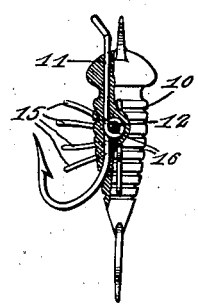
Figure 2 is a side elevation of the fly with a portion broken away.

In further carrying out the invention the fly is provided with legs formed of rubber threads 15 of greater resiliency, and consequently of greater shear resistance, than the sponge rubber body. These legs may be drawn through the body by the use of a needle and are gripped by the sponge rubber of the body as illustrated at 16 in Figure 1 to reinforce the body. The legs, some or all of the legs, may be drawn through the anchorage if the anchorage be a loop as shown in Figure 4 to reinforce the sponge rubber lock through the loop and prevent dislodgement of the sponge rubber fly body from the hook, since the legs are more resistant to shearing off than the sponge rubber lock under torsional or longitudinal deforming of the sponge rubber body on the hook.

From the above description it is thought that the construction and operation of the invention will be fully understood without further explanation.

What is claimed is:

A fishing fly comprising, a hook, a loop on the shank of the hook, a sponge rubber body simulating an insect body disposed on the hook having a portion engaged in the loop to prevent accidental dislodgement of the body from the hook, and legs on the body simulating the legs of an insect, said legs being formed of rubber threads drawn through the body and having an intermediate portion engaged through the loop to prevent shearing off of the legs at the body.

RAYMOND D. LANCASTER.